Figure 1:
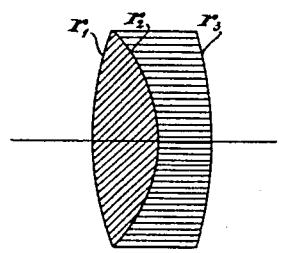

(No Model.)

P. RUDOLPH.
OBJECT GLASS.

No. 576,896. Patented Feb. 9, 1897.

Witnesses

Inventor
Paul Rudolph
by Marcus Bailey
his attorney

UNITED STATES PATENT OFFICE.

PAUL RUDOLPH, OF JENA, GERMANY, ASSIGNOR TO THE FIRM OF CARL ZEISS, OF SAME PLACE.

OBJECT-GLASS.

SPECIFICATION forming part of Letters Patent No. 576,896, dated February 9, 1897.

Application filed July 6, 1896. Serial No. 598,261. (No model.)

*To all whom it may concern:*

Be it known that I, PAUL RUDOLPH, doctor of philosophy, a subject of the Duke of Saxe-Altenburg, residing at Jena, in the Grand Duchy of Saxe-Weimar, German Empire, have invented a new and useful Object-Glass, of which the following is a specification.

The object of this invention is to facilitate the chromatic and spherical correction of lens systems, (object-glasses,) which are to be composed of single lenses cemented together.

In all object-glasses consisting of two lenses both chromatic and spherical aberration may be simultaneously corrected by making the negative constituent of the double lens of flint-glass, possessing not only a greater dispersive power but also a higher refractive index than the crown-glass of which the positive constituent is formed, so that the inner or cemented surface of the compound lens produces a negative spherical aberration, which by suitably selecting the curvatures is made equal to the positive spherical aberration of the two outer surfaces of the compound lens, so as to compensate for the last-mentioned aberration.

In the case of achromatic lenses which, like the object-glasses of ordinary telescopes, are only used with a relative aperture of one-tenth to one-sixth a degree of spherico-chromatic correction sufficient to meet most requirements of practice may by the above method be secured with any pair of flint and crown glass, where the refractive index of the flint does not too closely approach that of the crown. For considerably larger relative apertures, however, the correction of such lenses is somewhat seriously interfered with by the circumstance that among the available kinds of optical glass there cannot be found such pairs of flint and crown with which achromatism is attainable without a material enlargement of the total outer curvature—*i. e.*, of the algebraic difference between the reciprocal radii of the outer surfaces—of the compound lens over and above that total outer curvature which would be required for a non-composite (non-achromatic) lens of the same focal length. In order to avoid the necessity of thus augmenting in the case under consideration the total outer curvature of the compound lens and to obviate the objectionable increase of the spherical aberration of its outer surfaces that would result therefrom, pairs of flint and crown glasses would be necessary wherein the dispersive power of the flint-glass is far more considerable than that of the crown-glass, while its refractive power exceeds that of the crown-glass only to an extent sufficient to produce the desired corrective effects upon the inner surface. Among the existing kinds of glass, however, a great value of the ratio $d\ n^{fl} : d\ n^{cr}$ of the dispersive powers of the flint and the crown is always associated with a comparatively great difference $n^{fl} - n^{cr}$ between their refractive indices, the consequence being that in the case of a comparatively large relative aperture no achromatic combinations can be formed by cementing together a flint-glass lens and a crown-glass lens unless the total outer curvature of the object-glass is made so large that a sufficient correction of the spherical aberration becomes impossible. This drawback, which has so far hindered cemented lens systems to be adopted for certain purposes—namely, the lack of flint-glass possessing a great dispersive power, but a comparatively small refractive power—may, however, be entirely obviated by producing indirectly (while employing the kinds of glass now available) the same effect as would be obtained directly with flint-glass of a comparatively low refractive index, but the dispersive power of which might be increased at will. This result is attained by constructing the negative component of the double lens also as a compound lens consisting of two components—viz., a negative lens, the radii $r^2\ \rho$ of which present an increased total curvature in comparison with a non-composite negative component of the double lens, and a positive lens, of the radii $\rho\ r^3$, cemented to the said negative one and made of glass of the same refractive index but of a less dispersive power, so that the total outer curvature of the compound lens—that is to say, the difference $\frac{1}{r^2}-\frac{1}{r^3}$—still constitutes a lens of negative character.

A compound negative lens made up as just described has the following characteristic properties: First, with regard to effects independent of color—i. e., refraction (or variation of the divergence of the pencils of rays traversing the lens) and spherical aberration—such lens (owing to the fact that on the intermediate surface, the radius of which is $\rho$, the light is refracted but to an imperceptible extent, or not at all) will behave exactly like a single lens of homogeneous material, having the same outer curvatures. Second, with regard to the chromatic dispersion attending the said variation of divergence the lens in question will be equivalent to a single (homogeneous) negative lens of the same total outer curvature and supposed to be made of glass of greater dispersive power than the maximum dispersive power actually existing in the constituent parts of the compound negative lens.

If a portion of a simple negative lens were replaced by a positive lens of the same contour and the same refractive index as the displaced portion but of a less dispersive power, the result would be a compound negative lens of the same refractive power as the original but of greater dispersive power, since the positive dispersion of the substituted positive portion would not be sufficient to neutralize the increase of the negative dispersion of the remaining negative lens resulting from the increased curvature of this remaining negative lens as compared to the original negative lens. The total curvature $\frac{1}{r^2}-\frac{1}{\rho}$ of the remaining negative lens surpasses the total curvature $\frac{1}{r^2}-\frac{1}{r^3}$ of the original negative lens by the amount of the total curvature $\frac{1}{\rho}-\frac{1}{r^3}$ of the substituted positive lens, and as the dispersive power of the remaining lens is supposed to be greater than that of the positive lens the positive dispersion of the latter cannot neutralize the increase due to the increase of the total curvature of the negative dispersion of the negative lens. Thus the effect of the supposed substitution would be the same as if the original negative lens had been made of a glass of greater dispersive power.

Owing to the latter effect such a hyperchromatic lens presents, therefore, with regard to chromatic dispersion, an analogous phenomenon as is known to exist in the combined layers of the eye-lens of vertebrate animals with regard to refraction, where the resultant average refractive power of the combined lens is greater than the maximum value actually occurring in its interior.

Mathematically the resultant dispersive power $\triangle n'$ of a negative compound lens constructed in the manner described above may be determined by means of the following formula, which may be readily deduced:

$$\triangle n' = \triangle n + \frac{K}{k'}(\triangle n - \triangle \nu).$$

$\triangle n$ expresses the (higher) dispersive power of the negative constituent; $\triangle \nu$, the (lesser) dispersive power of the positive constituent; $k'$, the absolute value of the total outer curvature of the compound lens, (or, in other words, the value of the difference $\frac{1}{r^2}-\frac{1}{r^3}$, irrespective of the sign,) and K the total curvature $\left(\frac{1}{\rho}-\frac{1}{r^3}\right)$ of the positive constituent contained in the compound negative lens. According to this formula the resulting average dispersive power of the compound negative lens will surpass the dispersive power $\triangle n$ of the glass of the negative component, owing to the additional effect of the positive component, although of less dispersive power $\triangle \nu$, firstly, in proportion to the excess of $\triangle n$ over $\triangle \nu$, and, secondly, according to the ratio $K:k'$. Thus a negative lens made of flint-glass of a given dispersive power $\triangle n$ may by inserting in it a positive lens of another kind of glass of less dispersive power $\triangle \nu$, without varying its total outer curvature $k'$, be provided, as it were, with a higher dispersive power $\triangle n'$, the degree of which may be optionally increased by diminishing the radius $\rho$ of the intermediate surface of the combination. Moreover, it will be observed that the compound negative lens, provided the condition of an equal refractive power in both its constituent parts be fulfilled, will, as regards variation of divergence and spherical as well as chromatic aberration, be exactly equivalent to a single homogeneous lens with the same outer curvatures, made of glass, which is supposed to combine with the same refractive index as that of the compound lens the increased dispersive power $\triangle n'$.

Only in respect of the variation of spherical aberration relatively to rays of different colors does the compound negative lens under consideration not behave exactly as would a single lens of glass of the supposed high dispersive power. This variation of spherical aberration depending from the color of the rays, or, in other words, the chromatic difference of spherical aberration, is in the case of the compound negative lens less than it would be under like circumstances in the case of an equivalent single lens with equal outer curvatures could the supposed high dispersive power really be inherent in its substance, for on the two outer surfaces of the compound lens on which mainly originate both the spherical aberration itself, and also consequently the differences thereof relative to the various colors, only the comparatively small actual values $dn\ d\nu$ of dispersing power produce chromatic effect, whereas in a corresponding single lens the supposed greater value would come into operation on both surfaces. This reduced chromatic difference of the negative spherical aberration amounts to a further advantage, arising from the achromatism provided for by constructing a compound negative lens in the manner described—viz., the surplus of the spherical correction of the blue rays over that of the red rays is thereby reduced, which overcorrection in an achromatic lens system consisting of components cemented together is unavoidable and must prove all the more injurious to the general effect of the system the greater the extent to which it is allowed to subsist. Owing to these two advantages, namely, the last-mentioned reduction of the chromatic difference in spherical correction and the reduction of the total outer curvature previously referred to, the achromatizing method herein described, by means of a compound negative lens instead of by a single dispersing lens as usual in the ordinary cemented double object pieces, realizes an essential improvement in the production of spherically and chromatically corrected lens systems made up of cemented single lenses, this method affording the possibility of attaining with a considerably large relative aperture a degree of perfection as regards spherico-chromatic correction, which by the prior achromatizing method can only be reached with comparatively small relative apertures.

The inconvenience which consists in the addition of one more component to each lens system is practically counterbalanced by various favorable circumstances. Thus, inasmuch as only a scarcely perceptible amount of refraction, or, indeed, no refraction at all, takes place upon the intermediate surface having the radius $\rho$, the general effect will be found to be very insensible to anything occurring on that intermediate surface. The curvature of the same and the angles of incidence occurring thereon may therefore, without disadvantage, be augmented almost to any extent, and possible imperfections in the two lens-surfaces brought into contact (such as defective polishing or errors of shape) will remain almost entirely harmless, provided the two surfaces are cemented with a substance the refractive index of which approximately equals the refractive index common to both lenses. Suitable cementing materials having refractive indices as here required are readily procurable.

As to the pairs of flint and crown glass, which are required for negative lenses constructed according to the present invention, suitable pairs may be readily obtained, at least such as have a refractive index $n=1.54$ to $n=1.61$.

The table hereinafter given indicates (by way of example) the dispersive powers $\Delta n'$ which will be obtained in the hyperchromatic negative lenses when the ratio $\dfrac{K}{k'}$ is increased step by step and the components of the lens are supposed to be constructed of three different pairs of glass successively.

| | $K:k'$. | Resultant dispersion $\Delta n'$. |
|---|---|---|
| Pair of glasses: <br> $n=1.5399$    $\Delta n=0.01142$ <br> $\nu=1.5399$    $\Delta \nu=0.00909$ | 0.0 <br> 0.5 <br> 1.0 <br> 1.5 <br> 2.0 <br> 2.5 <br> 3.0 | 0.01142 <br> 0.01258 <br> 0.01375 <br> 0.01495 <br> 0.01608 <br> 0.01724 <br> 0.01841 |
| Pair of glasses: <br> $n=1.5730$    $\Delta n=0.01385$ <br> $\nu=1.5730$    $\Delta \nu=0.00995$ | 0.0 <br> 0.5 <br> 1.0 <br> 1.5 <br> 2.0 <br> 2.5 <br> 3.0 | 0.01385 <br> 0.01580 <br> 0.01775 <br> 0.01970 <br> 0.02165 <br> 0.02360 <br> 0.02555 |
| Pair of glasses: <br> $n=1.6120$    $\Delta n=0.01660$ <br> $\nu=1.6120$    $\Delta \nu=0.01068$ | 0.0 <br> 0.5 <br> 1.0 <br> 1.5 <br> 2.0 <br> 2.5 <br> 3.0 | 0.01660 <br> 0.01956 <br> 0.02252 <br> 0.02548 <br> 0.02844 <br> 0.03140 <br> 0.03436 |

Each of these pairs of glasses may serve for the construction of negative compound lenses, which, on being combined with a crown-glass collecting-lens the refractive index of which is less by from 0.03 to 0.10 than that of the compound dispersing-lens, will form an achromatic lens system, the total outer curvature of which is only a little larger than that of a corresponding single crown-glass lens of the same focal length.

It will be understood that the hyperchromatic negative lenses hereinabove described are applicable to any lens system that may require to be achromatized. In the case of those lens systems, however, in which all the constituent parts are cemented together, and which therefore represent compound lenses with only two surfaces in contact with the air, the said hyperchromatic negative lenses overcome, by diminishing the total outer curvature of the lens system and the chromatic difference of the spherical aberration of the negative lens, constructional difficulties which cannot be removed by other means. Moreover, in such lens systems it makes no material difference in the specific advantages, which affords the hyperchromatic negative lens, whether this lens be connected with only one collecting-lens or with two such lenses, or, in other words, whether the complete lens system consists of three or of four constituent single lenses. Besides, the employment of such a compound negative lens together with two other lenses admits of the same variations in the order of succession of the latter lenses as those which are feasible in a treble lens with a non-composite negative component.

Figure 2:
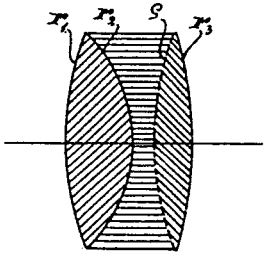
Figure 3:
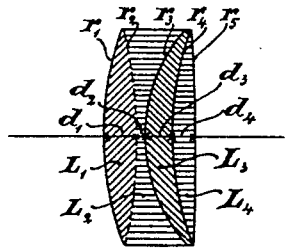
Figure 4:
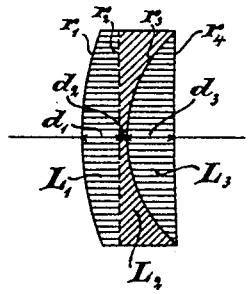

In the annexed sheet of drawings, Figure 1 represents the fundamental form of the usual achromatic lens combined of two components cemented together. From this biconvex compound lens the other characteristic forms may be derived by mere "bending"—that is to say, by altering the three radii of curvature $r'$ $r^2$ $r^3$ while retaining a constant value of the total curvature (i. e., of the algebraic difference between both curvatures measured by the reciprocal radii) of either lens. Fig. 2 represents a biconvex compound lens, as shown in Fig. 1, but in which the negative component is itself a compound lens constructed according to the present invention. The inner surface (having the radius $\rho$) of the compound negative lens has been shown in dotted lines, so as to indicate the equal refractive index of both components. Figs. 3 and 4 represent two cemented lens systems forming examples of the invention, the numerical data of the compound lenses being given hereinafter.

The letters $r'$ $r^2$ $r^3$ $r^4$ $r^5$ denote the radii of the spherical lens-surfaces, $d'$ $d^2$ $d^3$ $d^4$ the thicknesses of the lens in the optical axis of the system, and $L'$ $L^2$ $L^3$ $L^4$ the different lenses. The following two tables, corresponding to Figs. 3 and 4, respectively, take reference to these letters and to the diameter D, common to all components of a lens system, the radii, thicknesses, and diameters of the lenses being represented by numbers which relate to the focal length of the total lens system as to the unit. Therefore the dimensions of the components of an object-glass of any required focal length are obtained by multiplying the numbers given in the table by the amount of the focal length. The kinds of glass are distinguished, firstly, by the refractive indices $n^D$ relating to the D line of the solar spectrum, and $n^{G'}$ relating to the H$\gamma$ line of the hydrogen spectrum, and, secondly, by the value $\frac{\triangle n}{n-1}$ of the so-called "relative dispersion," in which ratio $\triangle n$ is taken between D and H$\gamma$, while the amount of $n^D$ has been expressed as $n$.

First example, Fig. 3: Spherically and chromatically corrected object-glass allowing a relative opening 0.333 and consisting of four single lenses cemented together—viz., a biconvex collecting-lens $L'$, a biconcave dispersing-lens $L^2$, and two collecting-lenses $L^3$ and $L^4$, the lenses $L'$ and $L^2$ being made of kinds of glass which have nearly equal refractive indices and such dispersive powers that by the combination of these lenses a hyperchromatic negative lens is formed.

*Radii.*  *Thicknesses.*
$r' = +0.492$  $d' = 0.047$
$r^2 = -0.795$  $d^2 = 0.014$
$r^3 = +0.248$  $d^3 = 0.042$
$r^4 = +0.475$  $d^4 = 0.033$
$r^5 = -5.634$
Diameter: $D = 0.333$.

*Kinds of Glass.*

| | $n^D$. | $n^{G'}$. | $\frac{\triangle n}{n-1}$. |
|---|---|---|---|
| $L' = L^4$: | 1.60844 | 1.62217 | 0.0226 |
| $L^2$: | 1.60284 | 1.62060 | 0.0295 |
| $L^3$: | 1.51914 | 1.53020 | 0.0213 |

According to these values the hyperchromatic dispersing-lens is characterized by the following values of the properties hereinabove explained:

$L'$: $\nu = 1.6084$  $\triangle\nu = 0.01373$  $\frac{K}{k'} = 3.26$ $L^2$: $n = 1.6028$  $\triangle n = 0.01776$  $\triangle n' = 0.03092$ Second example, Fig. 4: Spherically and chromatically corrected object-glass allowing a relative opening 0.33 and consisting of three single lenses cemented together, whereof $L'$ and $L^2$ are the components of the hyperchromatic dispersing-lens, while $L^3$ is a collecting-lens made of a glass of a comparatively high refractive index.

*Radii.*  *Thicknesses.*
$r' = +0.4745$  $d' = 0.0527$
$r^2 = \infty$  $d^2 = 0.0132$
$r^3 = +0.2175$  $d^3 = 0.0527$
$r^4 = +9.8865$
Diameter: $D = 0.3296$.

*Kinds of Glass.*

| | $n^D$. | $n^{G'}$. | $\frac{\triangle n}{n-1}$. |
|---|---|---|---|
| $L'$: | 1.60844 | 1.62217 | 0.0226 |
| $L^2$: | 1.60841 | 1.62967 | 0.0349 |
| $L^3$: | 1.55540 | 1.57036 | 0.0269 |

*Properties of the Hyperchromatic Negative Lens.*

$L'$: $\nu = 1.6084$  $\triangle\nu = 0.01373$  $\frac{K}{k'} = 0.85$ $L^2$: $n = 1.6084$  $\triangle n = 0.02126$  $\triangle n' = 0.02763$

What I claim as my invention, and desire to secure by Letters Patent of the United States, is—

In a chromatically and spherically corrected lens system in which all the components are cemented together, a hyperchromatic negative compound lens consisting of a flint-glass dispersing-lens and a collecting-lens made of glass having about the same refractive but a less dispersive power than the glass of the dispersing-lens.

In testimony whereof I have hereunto set my hand in the presence of two subscribing witnesses.

PAUL RUDOLPH.

Witnesses:
RUDOLPH FRICKE,
BRUNO FÖRSTER.